April 9, 1940.  F. H. HELRIGEL  2,196,415
GRAINING MACHINE
Filed Nov. 23, 1938  3 Sheets-Sheet 1

INVENTOR
Floyd H. Helrigel.
BY
Harness, Dickey & Pierce.
ATTORNEYS.

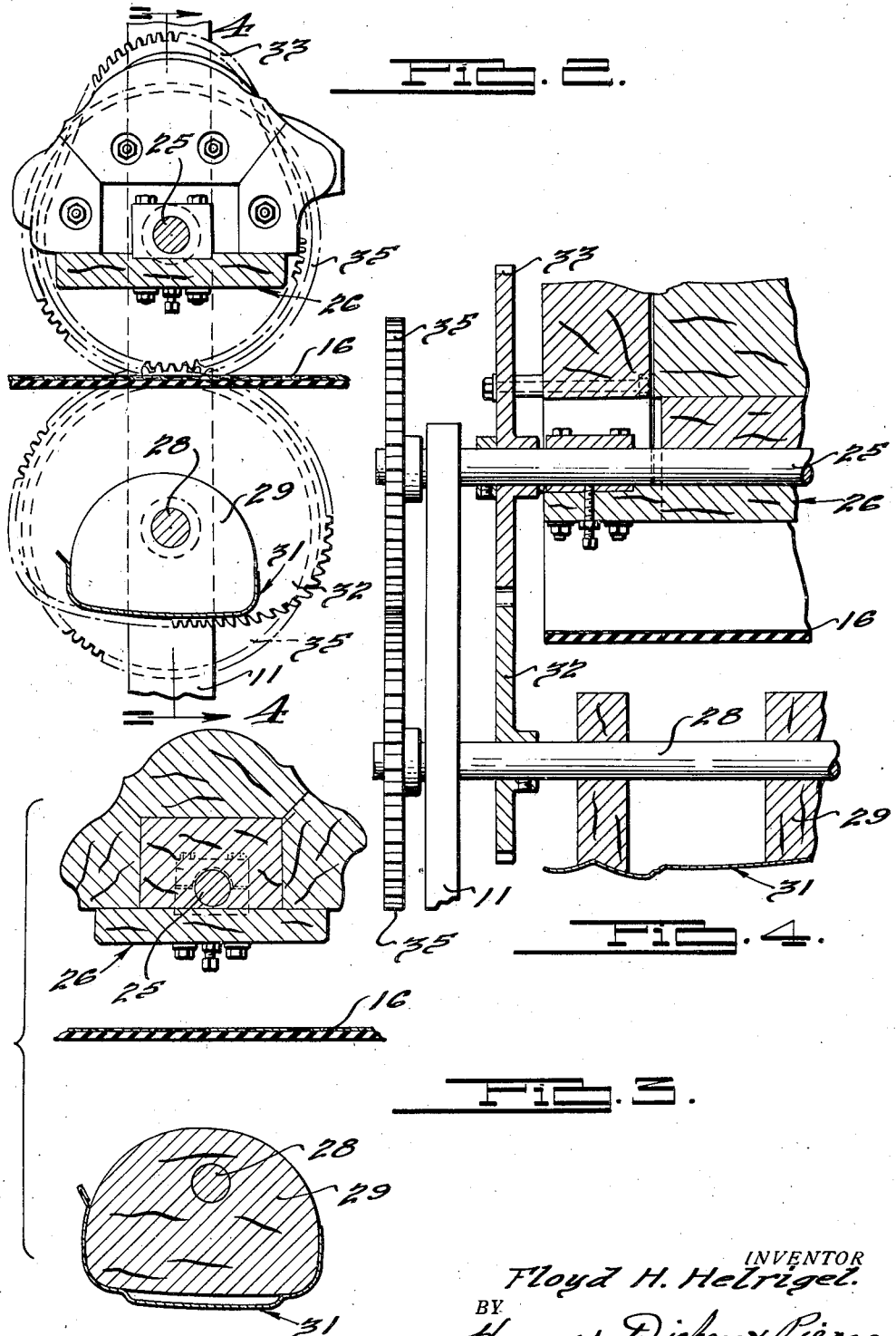

April 9, 1940.    F. H. HELRIGEL    2,196,415
GRAINING MACHINE
Filed Nov. 23, 1938    3 Sheets-Sheet 3
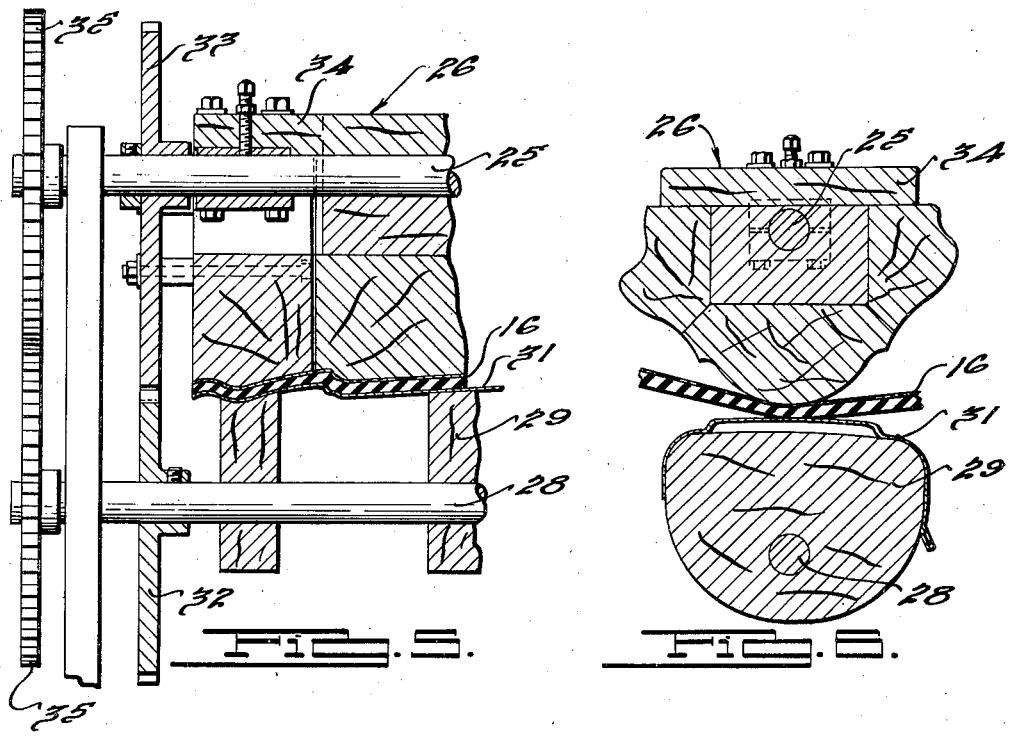
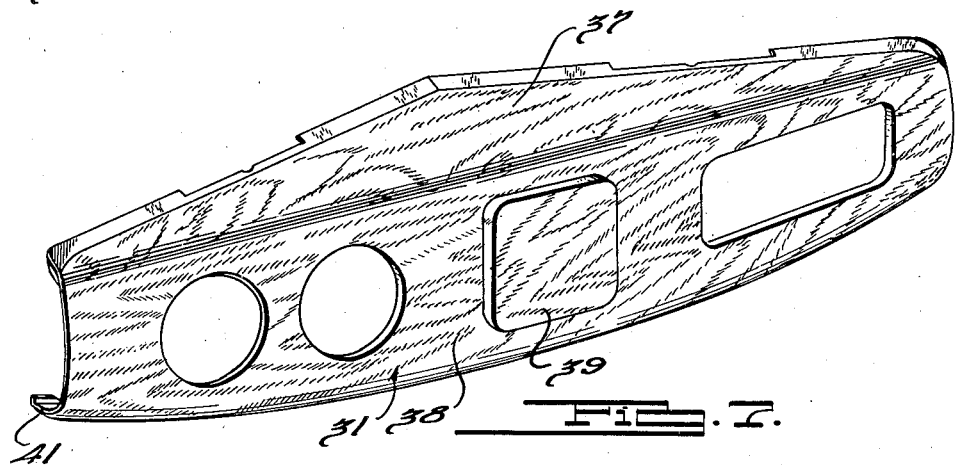
INVENTOR
Floyd H. Helrigel.
BY
Harness, Dickey & Pierce.
ATTORNEYS.

Patented Apr. 9, 1940

2,196,415

UNITED STATES PATENT OFFICE 2,196,415

GRAINING MACHINE

Floyd H. Helrigel, Detroit, Mich., assignor to The Murray Corporation of America, Detroit, Mich., a corporation of Delaware Application November 23, 1938, Serial No. 241,914

10 Claims. (Cl. 101—154)

My invention relates to graining machines, and particularly to a graining machine for transferring graining characteristics in ink from a belt to an irregular ornamental workpiece.

Heretofore when large stampings, or stampings which are irregular in form, were to be grained, a plurality of operations were made thereon to entirely grain the surface. For example, when an instrument panel for an automobile was to be grained, the face, top and bottom were grained in separate operations requiring retouching at the junction therebetween and at various other places on the stamping.

In practicing my invention, I am able to completely grain irregular stampings or elements during a single graining operation by employing a belt and backing roll which maintains a unit peripheral speed throughout the irregular surface of the workpiece as the belt passes thereover. I accomplish this by providing a backing roll having several sections of different radial dimensions and operate the sections at variable speeds. The belt passes between the backing roll and the workpiece and in view of the variable speeds of rotation of sections having different radial dimensions, the engaged surfaces maintain a substantially constant speed throughout the length of the stamping or element.

The ends of a stamping, such as the instrument panel above referred to, when disposed upon the work supporting roll are nearer to the axis of the roll than the central portion. It was found difficult to grain such a panel due to the fact that a belt or roll would travel at variable speeds over different portions of the panel, causing slippage and the smudging of the grain characters. By using a belt and a backing roll made up of sections of different radial dimensions, I am able to maintain the peripheral speed of the belt substantially constant throughout the length of the panel as the belt is forced into contact with the panel during the transfer operation.

Accordingly, the main objects of my invention are: to provide a transfer means for applying graining to a workpiece having different radial dimensions which maintains the peripheral speeds substantially constant when in engagement with the panel; to provide a transfer belt having a backing roll made of sections of different radial lengths and operate said sections at variable speeds of rotation to apply the belt to an irregular workpiece with substantially constant peripheral speed of engagement; to drive a portion of a backing roll for a transfer belt by a shaft, the other portion of which is driven from the shaft of the work supporting roll, the driving being so timed as to have the sections rotate at variable speeds; to operate graining means having different radial dimensions by means which maintains the peripheral speed of advancement between the graining means and workpiece substantially constant during a graining operation; and in general, to provide means for graining an irregular workpiece in a single operation by maintaining the surface engagement therebetween substantially constant, all of which is simple in construction and positive in producing a graining operation.

Other objects and features of novelty of my invention will be either specifically pointed out, or will become apparent when referring, for a better understanding of my invention, to the following description taken in conjunction with the accompanying drawings, wherein:

Fig. 2 is an enlarged sectional view of the structure illustrated in Fig. 1, taken on the line 2—2 thereof;

Fig. 3 is a sectional view of structure, similar to that illustrated in Fig. 2, taken through the center of the rolls;

Fig. 4 is a sectional view of structure illustrated in Fig. 2, taken on the line 4—4 thereof;

Fig. 5 is a view of the structure illustrated in Fig. 4 with parts in transferring position.

Fig. 6 is a view of the structure illustrated in Fig. 3, with parts in graining position; and, Fig. 7 is a perspective view of an instrument panel which has been grained to illustrate the irregular workpiece which may be grained by practicing my invention.

Figure 1:
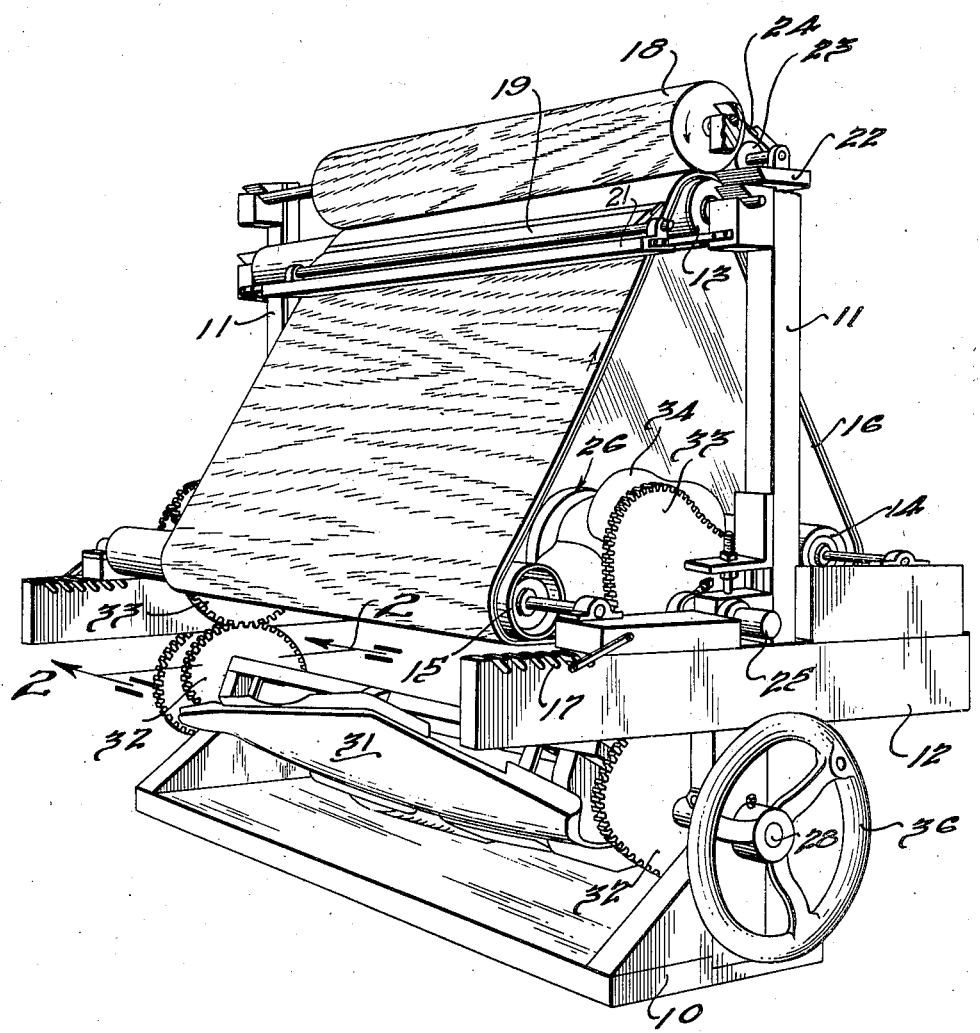
Figure 1 is a perspective view of a graining machine embodying features of my invention.

The graining machine embodies a base 10, having thereon uprights 11 and an intermediate frame 12. The uprights 11 support a backing roll 13, while the frame 12 supports idling rolls 14 and 15. About the rolls 13, 14, and 15, a transfer belt 16 is positioned, tensioned through the adjustment of the roll 15 along the frame 12 by means of the slots 17. Above the roll 13 the frame 12 supports a graining roll 18 in contact with the soft rubber face of the belt 16. A scraper blade 19 is supported by the uprights in contact with the surface of the belt 16 for scraping the ink from the surface remaining after a graining operation, which ink is collected in a pan 21 disposed below the blade.

An ink carrying tray 22 is disposed adjacent to the graining roll 18 in which a roller 23 operates to transfer the ink thereof to the graining roller which is forced into the graining recesses and scraped from the plane surface of the roll by a doctor blade 24. The ink remaining in the recesses is then transferred to the scraped surface of the belt 16 as it is advanced toward the workpiece.

Interjacent the idling rolls 14 and 15 a shaft 25 is journalled on the uprights 11, having thereon a workpiece backing roll 26 of unique construction. Below the belt and aligned with the shaft 25 a shaft 28 is journalled on the uprights 11, having thereon a work supporting roll 29. A workpiece 31 is carried by the roll 29 in such manner as to have its surface advance with the belt 16 under the pressure exerted by the backing roller 26 during a transfer operation.

The shaft 28 has secured thereto near each end, a gear 32 of unique form which mates with complementary gears 33 which are secured to separate end sections 34 of the backing roll 26. The sections 34 and the gears 33 secured thereto freely rotate on the shaft 25. The shafts 25 and 28 are operated in synchronism through a pair of gears 35 which are secured to the respective shafts. Suitable means, such as a motor may be employed to drive the graining machine and for the purpose of illustration, a hand wheel 36 is shown secured to the shaft 28. When the shaft 28 is rotated, the shaft 25 is driven in synchronism therewith through the gears 35. The central part of the backing roll 26 is driven with the shaft 25 while the end sections 34 are driven through the gears 32 and 33 from the shaft 28.

In Fig. 7, I have illustrated a workpiece 31 as being an instrument panel for an automobile, having a top ledge 37, a front face 38 with a protruding portion 39 and a lower inturned flange 41, all of which are grained during a single graining operation by my machine. It will be noted that the instrument panel is curved longitudinally of its length so that not only are shorter lengths provided to the end portion of the face of the panel, but such end portions are disposed closer to the shaft 28 than the central portion. It will be apparent therefore, that in rolling the panel relative to the belt 16 and backing roll 26, slippage must occur at various points along the panel because of the difference in radius of the portions of the panel relative to the shaft 28. As a result, instead of a sharp transfer being obtained, the ink when transferred is blurred as the surface of the transfer belt and that of the panel slide relative to each other. To overcome such slippage the backing roll 26 has the end sections of greater radius severed from the central section and driven independently thereof. The outer sections are of greater radius relative to the shaft 25 to be complementary to the shape of the instrument panel having shorter radii at the ends relative to the shaft 28. The belt 16 travels with uniform peripheral speed relative to the panel 31, but in view of the pressure applied to the belt by the solid backing roll of different radial dimension when driven in unison therewith, the blurring of the graining ink resulted.

The gears 32 and 33 have been constructed of unique form for operating the end sections 34 of the roll 26 at variable speeds relative to the movement of the central directly driven portion thereof. The end sections are advanced to a position of alignment with the central portion when contact with the panel 31 is first accomplished and then during the graining operation the sections are driven slower than the central portion to prevent the advancement of the ends of the belt faster than the central portion and maintain the peripheral speed of the end sections substantially the same as that of the central sections. This reduction in the peripheral speed of the end sections provides substantially a constant peripheral speed of advancement between the belt and panel 31 throughout the length of the panel and the smudging of the transfer ink is prevented.

The contour of the backing roll 26 is congruent to the contour of the instrument panel at any mated point throughout their rolling engagement. This provides a peculiar shape to the roll and it is to be understood that when other irregular elements or other shapes of instrument panels are to be grained in my machine that a backing roll 26 having a contour congruent to the contour of such element or panel will be employed for each such element or panel. These various backing rolls will be cut into sections, depending upon the difference in radial dimensions, and driven at different angular velocities to provide for the substantially uniform peripheral speed throughout the length of the roll during its engagement with the element or panel. As a result of the use of the transfer belt and the complementary formed backing roll, split in sections, an element having an irregular contour may be grained in a single operation of the machine.

While I have described and illustrated but a single embodiment of my invention, it will be apparent to those skilled in the art, that various changes, omissions, additions and substitutions may be made therein without departing from the spirit and scope of my invention, as set forth in the accompanying claims.

I claim as my invention:

1. In a graining machine, a rotatable graining roll, a rotatable transfer means embodying an element made of several sections, having its surface projecting different radial amounts from the axis, means for driving said sections in rotation, and means for varying the rotational speed of the sections whereby the sections will rotate together during a portion of their rotational movement and different amounts to have the surface speed substantially constant during another portion of said movement.

2. In a graining machine, a graining belt carried over rollers, a graining roll for applying ink to said belt, a work supporting roll disposed adjacent to the outer surface of said belt, a backing roll disposed within the belt opposite said work supporting roll, said backing roll being made of sections, driving means for said belt and rolls, and means for driving the sections of said backing roll at variable speeds.

3. In a graining machine, a transfer belt, a graining roll in contact with the outer surface of said belt, a backing roll for said graining roll, a work supporting roll, a backing roll for said work supporting roll, said work supporting roll and backing roll therefor having an irregular contour conforming to that of a workpiece to be grained, said work backing roll being made of sections, and means for driving said rolls and belt in synchronism and said sections at variable speeds during a graining operation.

4. In a graining machine, a graining roll, a transfer belt, a backing roll for said graining roll within the belt, two idler rolls within the belt to have the belt disposed in triangular relation, a work supporting roll adjacent to one side of said triangularly disposed belt, a backing roll disposed within the belt and adjacent to said work supporting roll, the contour of said work supporting roll and backing roll being irregular to conform to the shape of the workpiece.

5. In a graining machine, a graining roll, a transfer belt, a backing roll for said graining roll within the belt, two idler rolls within the belt to have the belt disposed in triangular relation, a work supporting roll adjacent to one side of said triangularly disposed belt, a backing roll disposed within the belt and adjacent to said work supporting roll, the contour of said work supporting roll and backing roll being irregular to conform to the shape of the workpiece, said backing roll for said work supporting roll being made of sections having different radial dimensions, and means for rotating said sections at variable speeds.

6. In a graining machine, a graining roll, a transfer belt, a backing roll for said graining roll within the belt, two idler rolls within the belt to have the belt disposed in triangular relation, a work supporting roll adjacent to one side of said triangularly disposed belt, a backing roll disposed within the belt and adjacent to said work supporting roll, the contour of said work supporting roll and backing roll being irregular to conform to the shape of the workpiece, said backing roll for said work supporting roll being made of sections of different radial dimensions, and means for driving said sections during a graining operation to have the peripheral speed of the entire sectional backing roll substantially a constant.

7. In a graining machine, a work supporting roll, a backing roll, a transfer belt disposed between said rolls the surface of said rolls being congruous and irregular, and having portions thereon of different radial dimensions, said backing roll being divided into sections in accordance with the different radial dimensions thereof, means for driving said work supporting roll and a section of said backing roll in synchronism, and means for driving another section of said backing roll at a variable rotational speed.

8. In a graining machine, a work supporting roll, a backing roll, a transfer belt disposed between said rolls the surface of said rolls being congruous and irregular, and having portions thereon of different radial dimensions, said backing roll being divided into sections in accordance with the different radial dimensions thereof, means for driving said work supporting roll and a section of said backing roll in synchronism, and means for driving another section of said backing roll at a different rotational speed, said means embodying a pair of mating gears having the periphery thereof disposed at different radial lengths at predetermined portions of said periphery.

9. In a graining machine, a work supporting roll, a backing roll, a transfer belt disposed between said rolls, the surface of said rolls being congruous and irregular, and having portions thereon of different radial dimensions, said backing roll being divided into sections in accordance with the different radial dimensions thereof, means for driving said work supporting roll and a section of said backing roll in synchronism, and means for driving another section of said backing roll at a different rotational speed, said last named means embodying a pair of like gears having a portion of their periphery disposed on the arc of a circle and another portion on a cord thereof joined with smooth curves with said arc.

10. In a graining machine, a rotatable graining roll, a continuous belt inked from said graining roll, a backing roll for said belt made of at least two sections with the surface of said sections projecting different radial amounts from the axis of said roll, means for driving said sections in rotation and means for varying the rotational speed of the sections whereby the sections will rotate together during a portion of their rotational movement, and different amounts to have the surface speed substantially constant during another portion of said movement.

FLOYD H. HELRIGEL.